(12) United States Patent
Liang et al.

(10) Patent No.: US 7,852,592 B1
(45) Date of Patent: Dec. 14, 2010

(54) SPIRAL SLOPE APPROXIMATION OF SPIRAL PATTERNS WRITTEN TO A DISK OF A DISK DRIVE

(75) Inventors: Jiangang Liang, Sunnyvale, CA (US); Charles A. Park, Aromas, CA (US); Yilin Cai, Fremont, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 498 days.

(21) Appl. No.: 12/021,976

(22) Filed: Jan. 29, 2008

(51) Int. Cl.
*G11B 21/02* (2006.01)
(52) U.S. Cl. .............................. 360/75; 360/31; 360/51
(58) Field of Classification Search ........................ None
See application file for complete search history.

(56) References Cited

U.S. PATENT DOCUMENTS

| | | | |
|---|---|---|---|
| 6,005,727 A | 12/1999 | Behrens et al. | |
| 6,091,564 A | 7/2000 | Codilian et al. | |
| 6,920,004 B1 | 7/2005 | Codilian et al. | |
| 6,924,960 B1 | 8/2005 | Melkote et al. | |
| 6,937,420 B1 | 8/2005 | McNab et al. | |
| 6,943,978 B1 | 9/2005 | Lee | |
| 6,967,799 B1 | 11/2005 | Lee | |
| 6,985,316 B1 | 1/2006 | Liikanen et al. | |
| 6,987,636 B1 | 1/2006 | Chue et al. | |
| 6,989,954 B1 | 1/2006 | Lee et al. | |
| 7,002,761 B1 | 2/2006 | Sutardja et al. | |
| 7,019,937 B1 | 3/2006 | Liikanen et al. | |
| 7,088,533 B1 | 8/2006 | Shepherd et al. | |
| 7,136,253 B1 | 11/2006 | Liikanen et al. | |
| 7,145,744 B1 | 12/2006 | Clawson et al. | |
| 7,212,364 B1 | 5/2007 | Lee | |
| 7,230,786 B1 | 6/2007 | Ray et al. | |
| 7,477,472 B2 * | 1/2009 | Sado et al. | 360/75 |
| 2006/0171059 A1 | 8/2006 | Chan et al. | |
| 2007/0070538 A1 | 3/2007 | Lau et al. | |
| 2007/0211367 A1 | 9/2007 | Lau et al. | |

* cited by examiner

*Primary Examiner* — Jason C Olson (57) ABSTRACT

A disk drive that approximates spiral slope in spiral patterns is disclosed. The disk drive includes a disk having at least one spiral pattern that extends radially across the disk, a head to read a portion of the at least one spiral pattern, and a processor to approximate a spiral slope of the portion of the at least one spiral pattern. The processor approximates the spiral slope of the portion of the at least one spiral pattern by implementing operations including: reading amplitude values for the portion of the at least one spiral pattern; determining an amplitude value distribution based on the amplitude values; determining a curve-fitted function for the amplitude value distribution; and determining an approximate spiral slope based on the curve-fitted function.

20 Claims, 6 Drawing Sheets

SPIRAL SLOPE APPROXIMATION OF SPIRAL PATTERNS WRITTEN TO A DISK OF A DISK DRIVE

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

When manufacturing a disk drive, servo sectors may be written to a disk to define a plurality of radially-spaced concentric circumferential tracks. Each servo sector may include at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk.

An external servo writer may be used to write the servo sectors to the disk during disk drive manufacturing. Servo writers often employ extremely accurate head positioning mechanics, such as laser interferometers or optical encoders, to ensure that the servo sectors are written at the proper radial location and extremely accurate clocking systems may be utilized in order to write the servo sectors in the proper circumferential locations on the disk.

Alternatively, many disk drives have the capability to self-servo write servo sectors. During self-servo writing, the internal electronics of the disk drive are used to write the servo sectors. One technique used in self-servo writing disk drives is for the head of the disk drive to write a plurality of spiral reference patterns to the disk which are then processed by the disk drive to write the servo sectors along a circular path. For example, the spiral reference patterns may be written by moving the head from an outer diameter of the disk to an inner diameter of the disk. In the self-servo writing process, the head then writes the final servo sectors by servo-ing on the seeded spiral patterns.

However, during the spiral reference pattern writing process, errors may occur that affect the radial and circumferential position and slope of the spiral reference patterns and degrade the spiral patterns. These types of errors include vibration of the HDA, acceleration and de-acceleration errors, flutter, windage on the head and arm, flex circuit bias, temperature, etc. Errors in writing the spiral patterns may then propagate into the writing of the servo sectors, thereby degrading the operating performance of the disk drive and reducing the manufacturing yield.

Further, as disk drive manufacturers have been forced to increase data capacity in disk drives to remain competitive, a greater number of tracks per inch (TPI) are required to be servo-written to each disk to provide for increased data storage capacity. To accomplish this, the distance between each of the servo-written tracks has become increasingly smaller which often results in track squeeze errors (TSEs) wherein servo bursts deviate from their normal positions. TSEs may cause increased servo control errors during track following resulting in degraded performance, reliability issues, and even disk drive failure.

It is therefore desirable to employ techniques to accurately identify errors in the spiral reference patterns before self-servo writing occurs in order to maximize TPI and to minimize TSEs.

DETAILED DESCRIPTION

Figure 1:
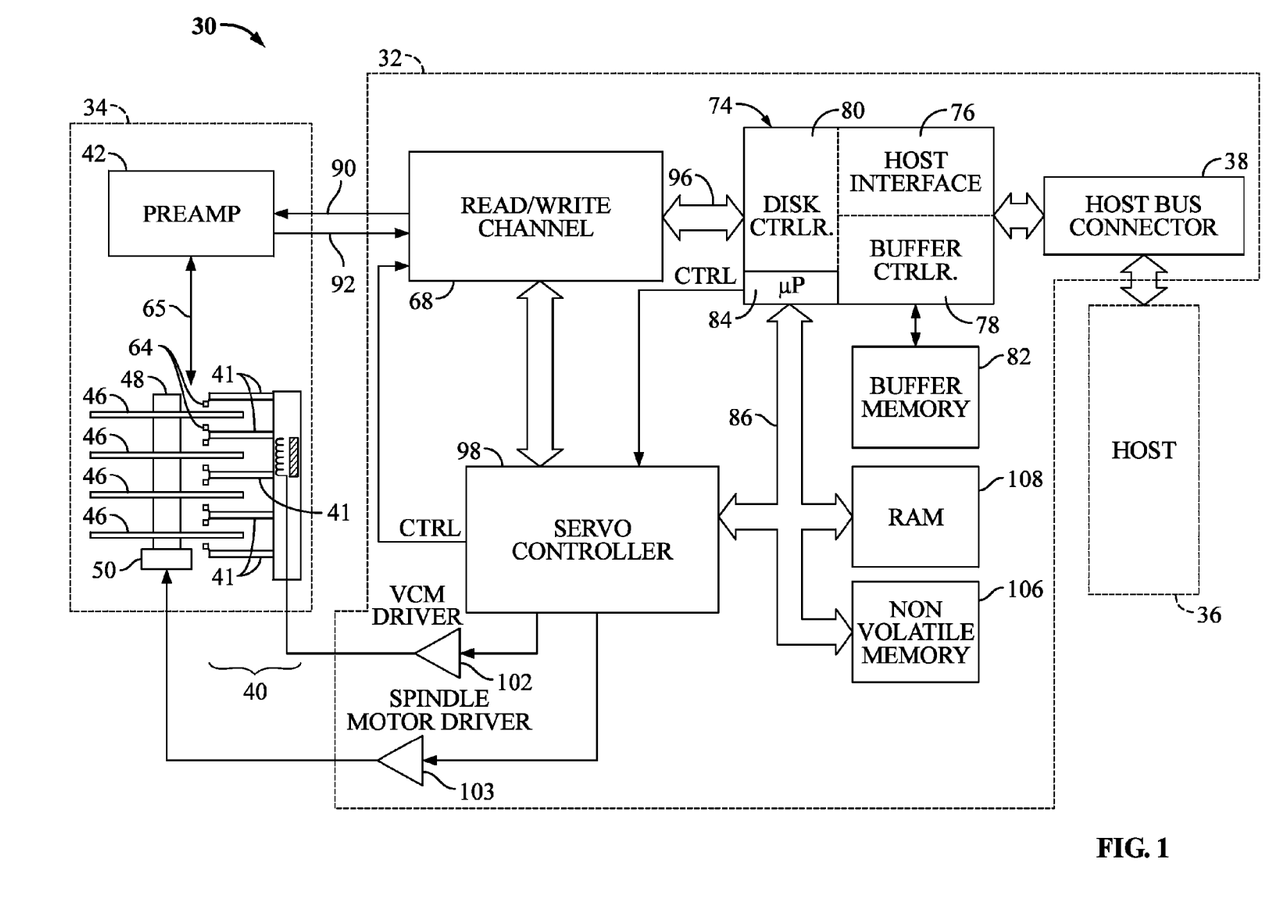
FIG. 1 is a simplified block diagram of a disk drive, according to one embodiment of the invention.

FIG. 1 shows a simplified block diagram of a disk drive 30, according to one embodiment of the invention. Disk drive 30 may comprise a Head/Disk Assembly (HDA) 34 and a controller printed circuit board assembly (PCBA) 32. Disk drive 30 may be of a suitable form factor and capacity for larger computers or for smaller mobile devices (e.g. a small form factor (SFF) disk drive). Host 36 may be a computing device such as a desktop computer, a laptop computer, server computer, a mobile computing device (e.g. PDA, camera, cellphone, etc.), or any type of computing device.

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90. Heads 64 may each include a reader portion and a writer portion.

Controller PCBA 32 may include read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

In one embodiment, microprocessor 84 may operate under the control of a program or routine to execute methods or processes to approximate spiral slope in spiral patterns, as will be described in more detail.

Host initiated operations for reading and writing data in disk drive 30 may be executed under control of microprocessor 84 of HIDC 74 which is connected to the controllers and memory arrays via bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Channel 68 may employ PRML (partial response maximum likelihood) coding techniques, although other coding processes may be utilized.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

Disk drive 30 may employ a sampled servo system in which equally spaced servo sectors (termed "servo sectors") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86. Each servo sector may include: a preamble having a phase lock loop (PLL) field, a servo synch mark (SSM) field, a track identification (TKID) field, a sector identifier (ID); and a group of servo bursts (e.g. an alternating pattern of magnetic transitions) that the servo control system samples to align the moveable transducer head with, and relative to, a particular track.

Typically, the servo controller 98 moves the transducer head 64 toward a desired track during a "seek" mode using the TKID field as a control input. Further, once head 64 is generally over a desired track, servo controller 98 uses the servo bursts to keep head 64 over the track in a "track follow" mode. During track following mode, head 64 repeatedly reads the sector ID of each successive servo sector to obtain the binary encoded sector ID number that identifies each sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Figure 2:
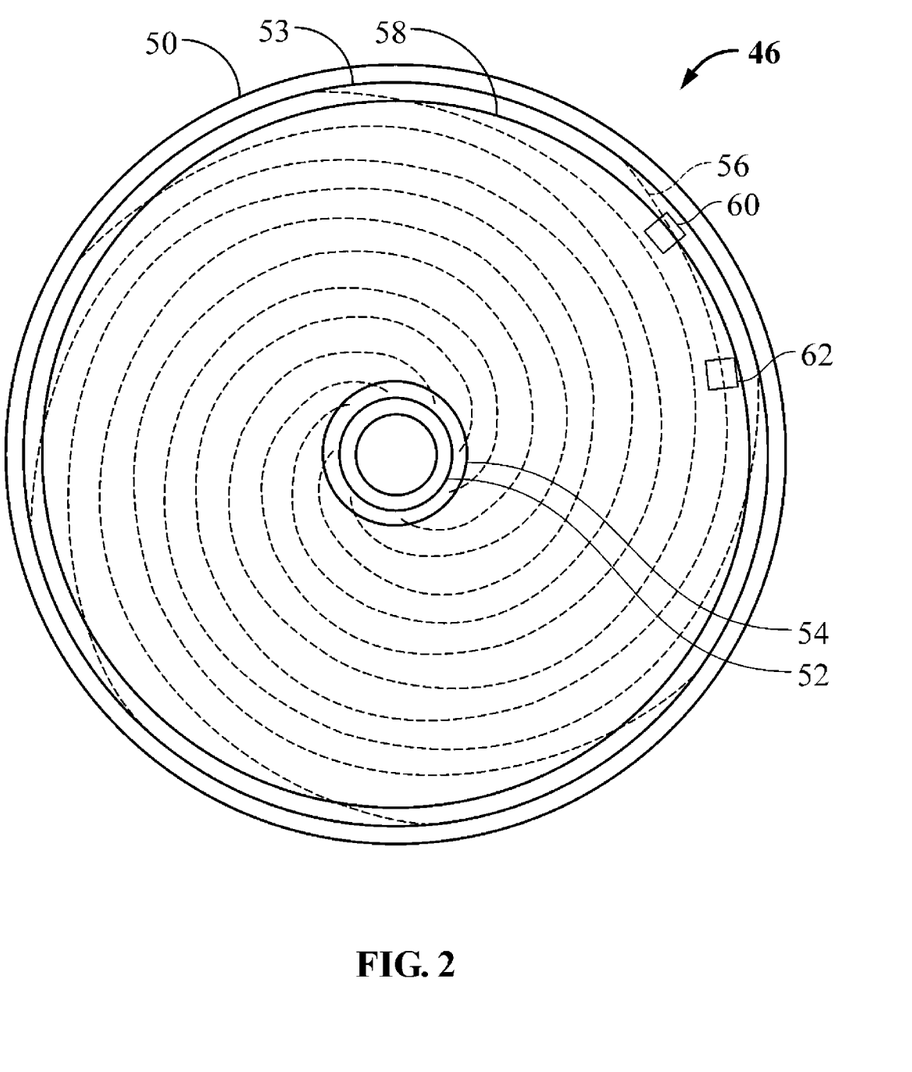
FIG. 2 is a diagram illustrating a plurality of spiral reference patterns extending radially across a disk, according to one embodiment of the invention.

In one embodiment, disk drive 30 may be a self-servo writing disk drive. FIG. 2 is a diagram illustrating a plurality of spiral reference patterns 56 extending radially across disk 46, according to one embodiment of the invention. Self-servo writing disk drive 30 may write a plurality of spiral references patterns 56 to disk 46 from an outer diameter (OD) reference track 53 near the OD 50 of disk 46 in a spiral fashion to an inner diameter (ID) reference track 54 near the ID 52 of disk 46. Each spiral pattern 56 extends radially across the disk 46 in a spiral fashion as shown in FIG. 2. Each spiral pattern 56 may typically comprise a high frequency signal interrupted at predetermined intervals by a synchronization mark. It should be appreciated that the use of spiral patterns in self-servo writing disk drives is well known. By tracking on the seeded spiral reference patterns 56, head 64 of self-servo writing disk drive 30 may write final servo sectors to define data tracks for disk 46 and for use in subsequent servo control.

In one embodiment, disk drive 30 may be a self-servo writing disk drive that approximates the spiral slope in spiral reference patterns 56 to determine whether spiral slopes for different portions of a spiral pattern at different radial locations exceed a spiral slope variance threshold. Microprocessor 84 (hereinafter termed "processor") of disk drive 30 may operate under the control of a program or routine to execute methods or processes in accordance with embodiments of the invention.

In particular, disk drive 30 may approximate the spiral slope of a portion 60 of a spiral pattern 56. For example, head 64 may successively read portion 60 of spiral pattern 56 along track 53. Processor 84 may then approximate the spiral slope of portion 60 of spiral pattern 56 by implementing operations including: reading the amplitude values of the portion 60 of the spiral pattern 56; determining an amplitude value distribution based upon the read amplitude values; determining a curve-fitted function for the amplitude value distribution; and then determining an approximate spiral slope based on the curve-fitted function. Head 64 by passing repetitively passing over portion 60 of spiral pattern 56 reads the high frequency signals of spiral pattern 64 and processor 84 may utilize these read the amplitude values for determining the amplitude value distribution.

It should be appreciated that embodiments of the invention may be implemented with processor 84, servo controller 98, and/or other circuitry of disk drive 30. Particularly, circuitry of disk drive 30, including but not limited to processor 84, may operate under the control of a program or routine to execute methods or processes in accordance with embodiments of the invention related to approximating the spiral slope of portion 60 of a spiral pattern 56. For example, such a program may be implemented in firmware or software (e.g. stored in non-volatile memory 106 or other locations) and may be implemented by processors such as processor 84, servo controller 98, and/or other circuitry of disk drive 30.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

Figure 3:
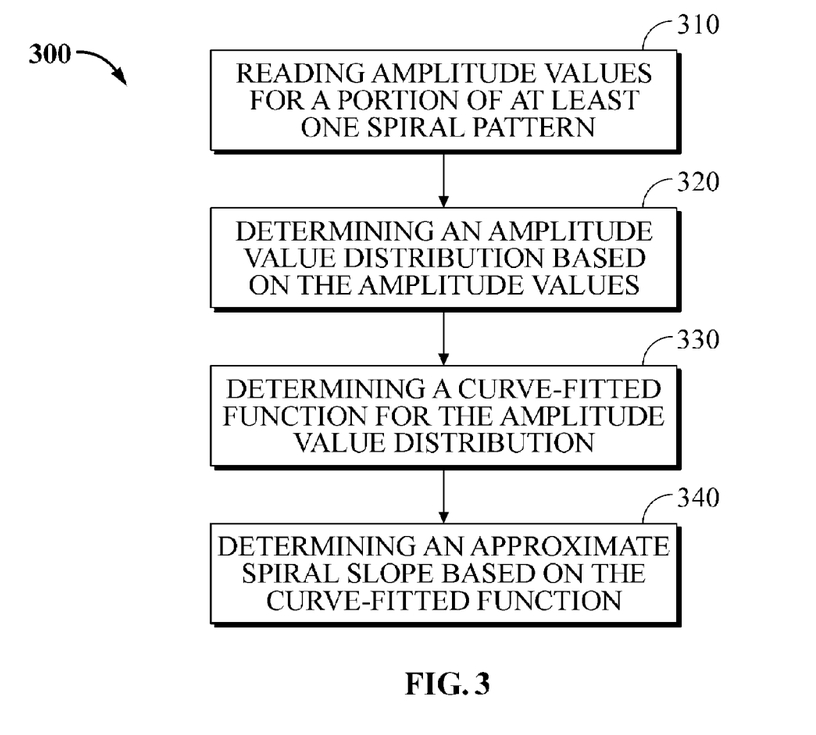
FIG. 3 is flow diagram illustrating a process that may be utilized to approximate the spiral slope of a portion of a spiral pattern, according to one embodiment of the invention.

FIG. 3 is flow diagram illustrating a process 300 that may be utilized to approximate the spiral slope of a portion of a spiral pattern, according to one embodiment of the invention. In one embodiment, process 300 may be implemented by processor 84 of disk drive 30 in conjunction with servo controller 98 to implement servo control operations. In particular, by having head 64 track-follow on track 58 a spiral slope for portion 60 of spiral pattern 56 (as shown in FIG. 2) may be approximated.

Amplitude values may be read for a portion of at least one spiral pattern (block 310). As an example, spiral pattern 56 may comprise a plurality of high frequency signals interrupted at predetermined intervals by synchronization marks such that the high frequency signals may be read by head 64 and processed by processor 84. An amplitude value distribution based upon the read amplitude values may then be determined (block 320). Further, a curve-fitted function for the amplitude value distribution may then be determined (block 330). Lastly, an approximate spiral slope based upon the curve-fitted function may be determined (block 340). By implementing the above-described process 300, the shape of the spiral pattern seen by head 64 is used to estimate the slope of the spiral pattern. The shape or slope of the spiral pattern may then be used to determine the track pitch of the track that may thereafter be servo-written.

Figure 4:
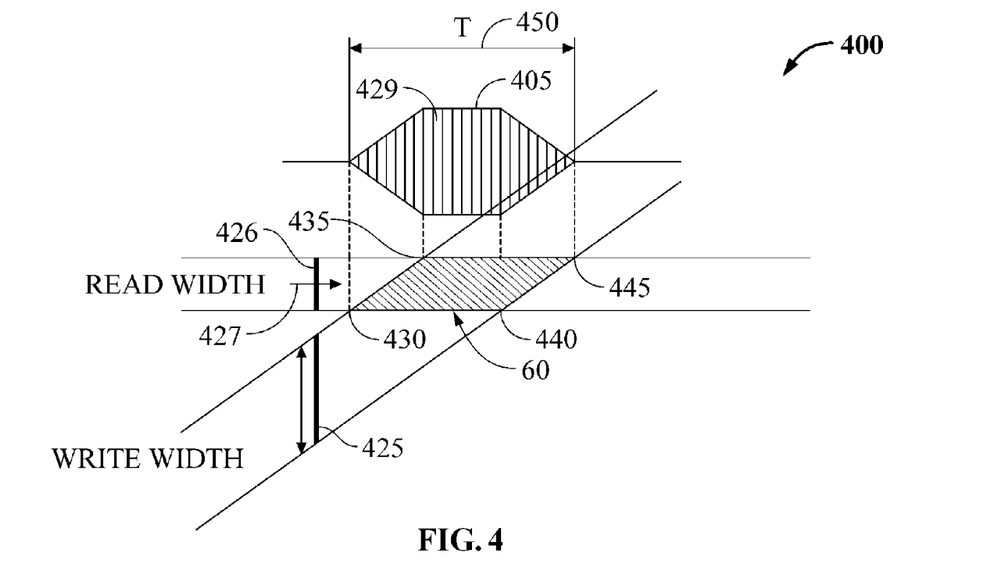
FIG. 4 is a diagram that illustrates a portion of a spiral pattern that may be read and processed by the processor of the disk drive to determine an approximate spiral slope, according to one embodiment of the invention.

FIG. 4 is a diagram that illustrates a portion 60 of a spiral pattern that may be read and processed by the processor of the disk drive to determine an approximate spiral slope, according to one embodiment of the invention. Portion 60 of the spiral pattern may be read by the reader of the head having a read width designated by marking 426. Signal 405 that is read from the spiral pattern may be football shaped as read by the reader. The shape of signal 405 is controlled by the write width (designated by marking 425) of the writer of the head which writes portion 60 of the spiral pattern to the disk.

As the reader moves in a direction indicated by arrow 427 toward portion 60, at point 430, the reader first encounters the high frequency signals (designated by markings 429) of portion 60 of the spiral pattern. At point 435, the read high-frequency signals reach maximum amplitude. At point 440, the amplitude of the high-frequency signals begins to decrease. Finally, at point 445, the high-frequency signals of the portion 405 of the spiral track are no longer read as the reader has completely passed over the portion 60 of the spiral pattern. As can be seen in FIG. 4, arrow 450 shows the time (T) that the reader reads the high frequency signals of portion 60 of the spiral pattern. Portion 60 of the spiral pattern may include both high frequency signals and synchronization marks.

The spiral radial velocity may be calculated by an equation of the form d=(R+W)/T; wherein R is the width of the reader, W is the width of the writer, and T is the amount of time that the reader reads the high frequency signals. When neglecting the reader and writer's skew angle, R and W can be treated as constant. Therefore, the spiral radial velocity is inversely proportional to the spiral time T as seen by the reader.

The track pitch for servo-fill depends upon spiral writing velocity. Because the spiral writing process is synchronized by a constant clock, the same number of spiral frames is generally written for every revolution of the disk. Thus, in general, the higher the spiral velocity is, the lower the track pitch. Conversely, the lower the spiral velocity is, the higher the track pitch. Therefore, it can be seen that track pitch is generally proportional to the spiral shape width in terms of T of the spiral pattern. Further, the spiral shape width is proportional to the slope of the spiral pattern. Thus, the tracks per inch (TPI) trend of a disk can be understood by looking at variations in the spiral width or spiral slope for different portions of the spiral pattern at different radial locations.

In order to approximate the spiral width or spiral slope of the portion of the spiral pattern, as previously described, amplitude values from the high-frequency signals of the spiral pattern are repetitively read for the portion of the spiral pattern to be approximated. Then, an amplitude value distribution based upon the amplitude values is determined.

These amplitude values to estimate spiral width and slope may be approximated using an integrated burst amplitude curve. As one example, the servo controller may utilize a servo gate comprised of small demodulation windows (hereinafter termed "spiral windows") that may be used to read the portion of the spiral pattern. The servo controller may integrate all of these spiral burst amplitudes for each spiral window and store these values, e.g., in registers of the disk drive's memory. Therefore, a snapshot of spiral shape can be represented by the values in these registers. Thus, upon each pass of the spiral portion of the spiral pattern during track following an amplitude value distribution can be determined.

The processor of the disk drive can fit these read amplitude values into a standard Gaussian distribution function such as in the equation below:

$$y = Ae^{\frac{-(x-u)^2}{2\sigma^2}}$$

In this equation, x is the number of spiral windows; y is the burst amplitude integration of x number of spiral windows; μ is a spiral window normalization factor that is usually close to zero; and sigma is the variance of the fitted curve. Thus, a Gaussian curve-fitted function for the amplitude value distribution may be determined.

It should be appreciated that during track following, the portion of the spiral pattern (i.e., the spiral shape) might be moving around the center of the spiral windows within a certain range. Therefore, before curve fitting, the sample data may need to be manipulated for normalization purposes. In particular, the distance of spiral shape away from the center of the window may be derived from calculated PES values such that the sample curve may be shifted towards the center by the distance calculated by PES values.

Figure 5:
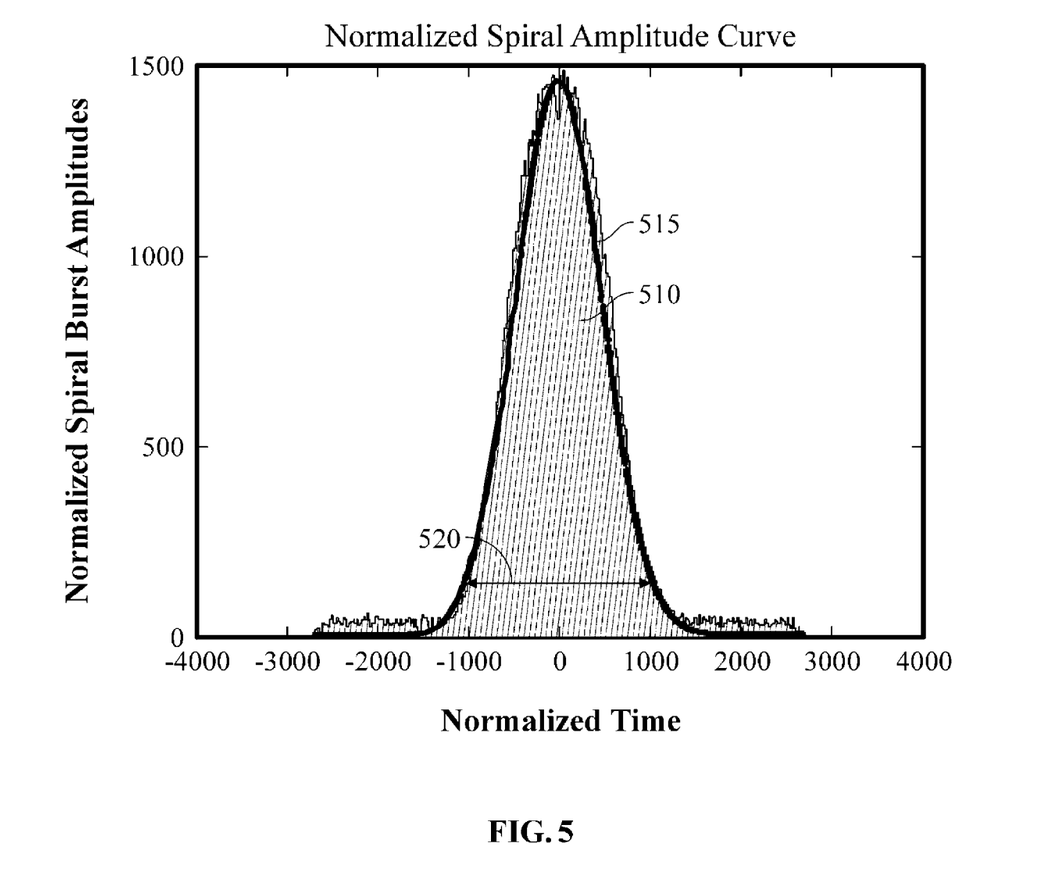
FIG. 5 is a diagram illustrating overlapped sampled amplitude distributions around a center of a spiral window including a curve fitted function, according to one embodiment of the invention.

In particular, FIG. 5 is a diagram illustrating example overlapped sampled amplitude distributions around a center of a spiral window including a curve fitted function, according to one embodiment of the invention. The y-axis is in terms of normalized spiral burst amplitudes and the x-axis is in terms of normalized time wherein 0 is the center of the spiral window. In particular, overlapped sampled amplitude distributions 510 are shown as being fitted into a Gaussian function and a curve-fitted Gaussian function 515 is shown for the amplitude value distribution.

The curve-fitted Gaussian function 515 (y) may be derived by taking the logarithm of both sides of the previously-described equation as follows:

$$\ln y = \ln\left(Ae^{\frac{-(x-u)^2}{2\sigma^2}}\right) = \ln A - \frac{(x-u)^2}{2\sigma^2} = ax^2 + bx + c,$$

$$\text{where: } a = -\frac{1}{2\sigma^2}; b = \frac{u}{\sigma^2}; c = \ln A - \frac{u^2}{2\sigma^2}$$

As can be seen in the example in FIG. 5, a Gaussian curve-fitted function 515 may be applied to the sampled averaged amplitude value distributions 510. Based upon the Gaussian curve-fitted function 515 an approximate spiral slope may be determined. The approximate spiral slope may be proportional to the average circumferential width of the portion of the spiral pattern which may be represented by indicator line 520. In particular, line 520 may represent an estimated average circumferential width of the portion of the measured spiral pattern. For example, the average circumferential width may be analogous to approximately three times the standard deviation value (σ). Alternatively, another value, such as approximately one or two times the standard deviation, may be used to represent an average circumferential width. As previously described, the spiral slope is proportional to the average circumferential width of the portion of the measured spiral pattern.

The processor may implement operations to measure an average duration of a curve-fitted function 515 for the amplitude value distributions 510 based upon the head of the disk drive repetitively passing over the portion of the spiral pattern. These values may be generated by the disk drive repetitively reading a portion of a spiral pattern and then performing the above-described calculations. The average spiral circumferential width or duration 520 is proportional to the spiral slope.

Thus, based upon a Gaussian curve-fit of multiple amplitude value distributions for a repetitively read portion of a spiral pattern on a track (e.g., portion 60 of spiral pattern 56 in FIG. 2), an average spiral width 520 may be obtained that is proportional to the spiral slope of the portion of the spiral track. By doing this same measurement for different radial positions of the same spiral pattern across the disk, a track per inch (TPI) trend for servo sectors that will eventually be written can be obtained.

It should be appreciated that a variety of different curve-fitting methodologies may be utilized to model portions of spiral patterns and to determine approximate spiral slopes based thereon, the above-described methodology, only being exemplary.

Figure 6:
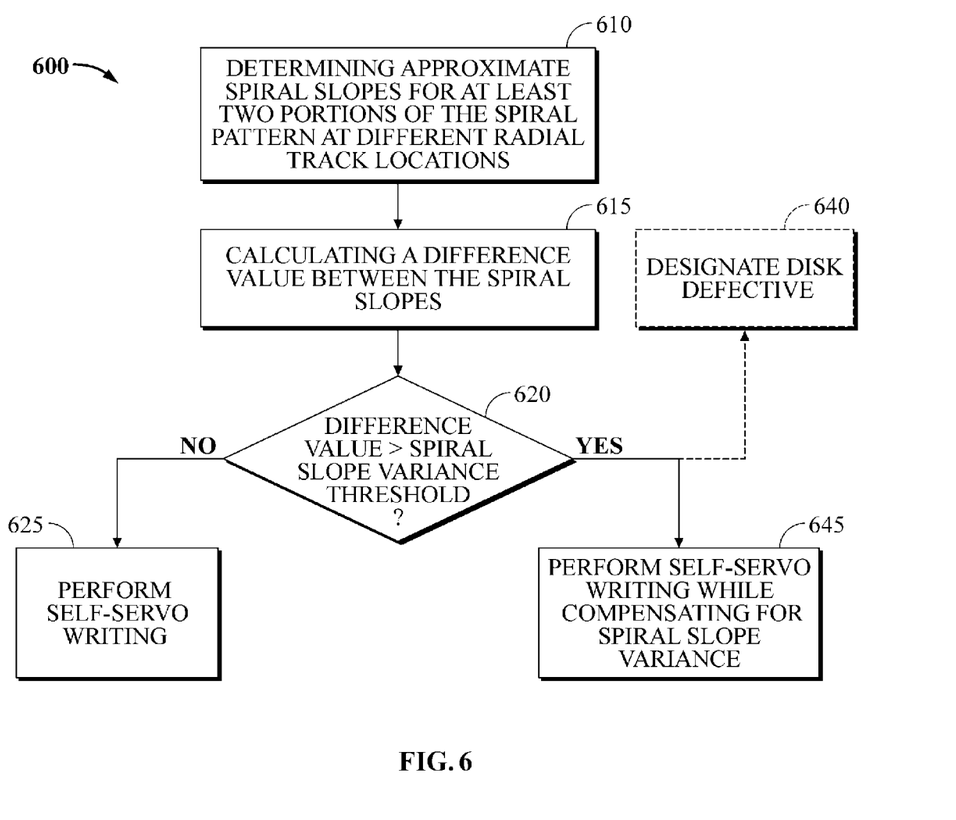
FIG. 6 is a flow diagram illustrating a process that may be utilized to determine if a spiral slope variance threshold is exceeded, according to one embodiment of the invention.

FIG. 6 is a flow diagram illustrating a process 600 that may be utilized to determine if a spiral slope variance threshold is exceeded, according to one embodiment of the invention. At block 610, spiral slopes for at least two portions of a spiral pattern at different radial locations may be determined. For example, the spiral slopes for each of the two portions of the spiral pattern at different radial track locations may be determined in accordance with the previously-described methodology. For ease of illustration, looking briefly back to FIG. 2, a first spiral slope for portion 60 of spiral track 56 may be determined at a first radial location and a second spiral slope 62 of the same spiral pattern 56 at a different radial location may also be determined. Next, a difference value between the spiral slopes is calculated (block 615). In one embodiment, process 600 may be implemented by processor 84 of disk drive 30 in conjunction with servo controller 98 to implement servo control operations and to implement the previously-described spiral slope determination methodology.

Next, at block 620, it is determined whether the difference value exceeds a spiral slope variance threshold. If not, self-servo writing may be performed because there is not a great degree of spiral slope variance within the tested spiral pattern (block 625). In particular, because the spiral pattern does not exhibit a great degree of spiral slope variance, it can be assumed that the tracks to be servo written will have a consistent tracks-per-inch (TPI) density profile, which may reduce the probability of written-in track squeeze errors (TSEs). It should be appreciated that the spiral slope variance threshold value may be chosen based upon design considerations as to an acceptable amount of TPI variance.

On the other hand, if the difference value does exceed a spiral slope variance threshold, then it can be assumed that the TPI profile will not be consistent (i.e., there is a lot of variance) and significant TSEs may occur. In this instance, the disk may be designated as defective (block 640). For example, the disk drive may be designated as defective and discarded due to the spiral slope variance in the spiral tracks of the disk. In another embodiment, the disk of the disk drive may be erased and new spiral patterns written and the disk drive may be re-habilitated. Alternatively, the portions of the disk having the spiral patterns that exhibit spiral slope variance above the threshold may still be servo-written to, but these tracks may be registered with the disk drive as defective and will not be used during disk drive operations.

In another embodiment, even if spiral slope variance exceeding the threshold is found, self-servo writing may still be performed utilizing a compensation factor for the spiral slope variance (block 645). For example, based upon the determined spiral slope variance for certain radial tracks of a disk drive, a compensation factor may be determined and, as part of a feed-forward loop, may be added to servo control operations during the servo-writing process to compensate for the spiral slope variance.

It should be appreciated that spiral slopes may be determined for different radial portions of spiral patterns based upon design and process considerations. For example, spiral slopes may be determined at pre-selected portions of a spiral pattern (e.g., OD and ID) or radially across the whole spiral pattern. Further, spiral slopes may be calculated for a sub-set of spiral patterns of the disk or for every spiral pattern of the disk. These variations may be utilized with previously-described process 600.

Figure 7A:
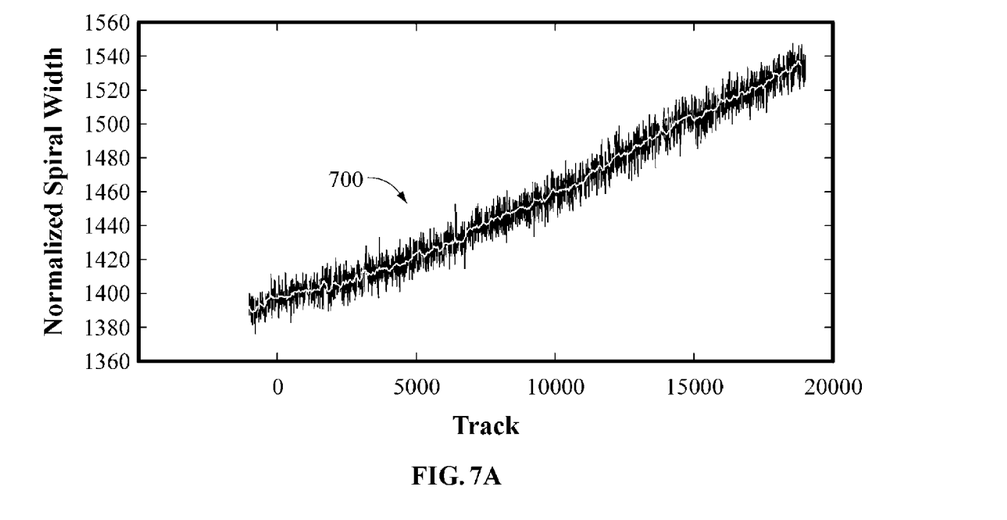
FIG. 7A is a graph illustrating example averaged circumferential spiral widths of a spiral pattern that extends radially across the disk in which the spiral pattern has generally low spiral slope variance, according to one embodiment of the invention.

FIG. 7A is a graph illustrating example averaged circumferential spiral widths of a spiral pattern that extends radially across the disk in which the spiral pattern has generally low spiral slope variance, according to one embodiment of the invention. As can be seen in FIG. 7A, the y-axis represents normalized spiral width and the x-axis represents the tracks from the outer diameter (OD) to the inner diameter (ID). As can be seen in graph 700, although there are pronounced differences between normalized spiral widths of the spiral pattern at adjacent tracks, these differences average out such that there is not a great degree of spiral slope variance between adjacent tracks that would lead to extreme localized TPI profile variances and induced TSEs. Thus, the example in FIG. 7A would illustrate a spiral pattern that generally does not have extreme spiral slope variance and that would be suitable for use in spiral self-servo writing.

Figure 7B:
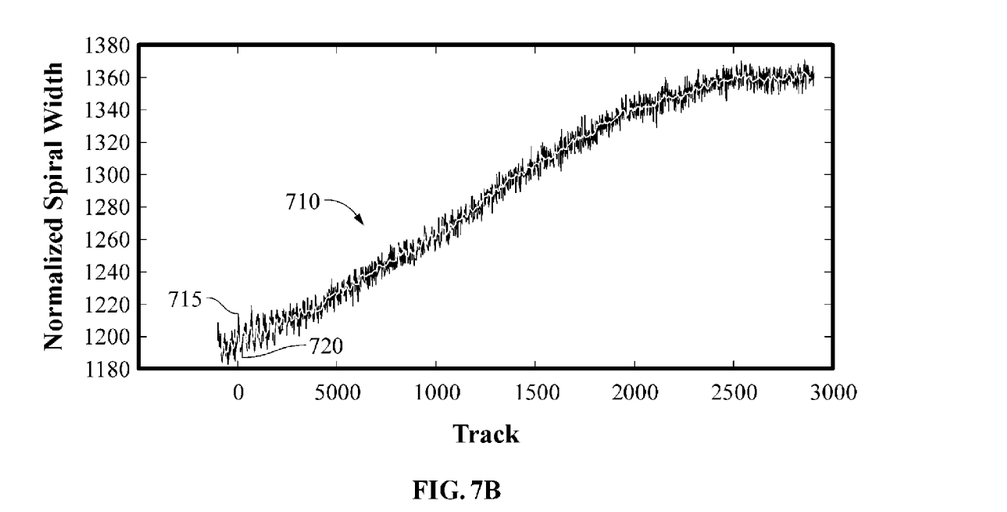
FIG. 7B is a graph illustrating example averaged circumferential spiral widths of a spiral pattern that extends radially across the disk in which the spiral pattern has generally high spiral slope variance, according to one embodiment of the invention.

On the other hand, FIG. 7B, is a graph 710 that shows an example spiral pattern that includes spiral slope variance of averaged circumferential spiral widths that exceed the spiral slope variance threshold. As can be seen in graph 710, the pronounced differences between the spiral widths of the spiral pattern at adjacent tracks do not appear to average out such that there is a great degree of spiral slope variance between adjacent tracks that would lead to extreme localized TPI profile variances and induced TSEs.

Particularly, looking at normalized spiral widths 715 and 720 that are at adjacent tracks near the OD, it can be seen that the spiral slope variance between points 715 and 720 is extreme such that they may exceed a spiral slope variance threshold and may induce extreme localized TPI profile variances and induced TSEs. Accordingly, the example in FIG. 7B illustrates a disk having a spiral pattern that includes a great deal of spiral slope variance and that may be designated as defective or may have to utilize the previously described compensation mechanism if it were to be used for self-servo writing.

The above-described methodology may be utilized to detect extreme spiral slope variance, for example, due to OD or ID spiral oscillation, before self-servo writing is commenced. Thus, a TPI profile can be determined after spiral pattern seeding but before the filling of the final servo pattern to determine if the TPI profile is valid and whether or not too many TSEs would result. This allows for the discarding of the disk or disk drive before servo writing or for compensation during servo-writing.

It should be appreciated that the previously-described processes and techniques may be implemented by a program or routine implemented by the processor or other circuitry of the disk drive. Further, is should be apparent those of skill in the art that the previously-described graphs (e.g. FIGS. 5 and 7) are examples for illustration purposes and that actual signal characteristics and amplitudes may vary according to embodiments of the invention and that the curves and data shown therein are used as a general descriptive illustrations to illustrate the type of data that may be processed by the processor.

It should further be appreciated that components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium. Further, the "processor readable or accessible medium" may include any medium that can store, transmit, or transfer information. Examples of accessible medium include an electronic circuit, a semiconductor memory device, a read only memory (ROM), a flash memory, an erasable ROM (EROM), a floppy diskette, a compact disk (CD-ROM), an optical disk, a hard disk, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes previously described can be employed for disk drives that self-servo write embedded servo sectors. However, numerous alternatives for disk drives with similar or other media format characteristics can be employed by those skilled in the art to use the invention with equal advantage to implement these techniques. Further, although embodiments have been described in the context of a disk drive that performs self-servo writing of servo sectors, the invention can be employed in many different types of disk drives having a head that scans the media.

What is claimed is:

1. A method for approximating spiral slope in spiral patterns of a disk of a disk drive, the spiral patterns extending radially across the disk, the method comprising:
    reading amplitude values for a portion of at least one spiral pattern;
    determining an amplitude value distribution based on the amplitude values;
    determining a curve-fitted function for the amplitude value distribution; and
    determining an approximate spiral slope based on the curve-fitted function.

2. The method of claim 1, further comprising:
    determining approximate spiral slopes for at least two portions of the at least one spiral pattern at different radial track locations; and
    calculating a difference value between the spiral slopes of the at least two portions.

3. The method of claim 2, further comprising:
    determining that the difference value exceeds a spiral slope variance threshold; and designating the disk as defective.

4. The method of claim 2, further comprising:
    determining that the difference value exceeds a spiral slope variance threshold; and compensating for spiral slope variance during servo writing.

5. The method of claim 1, wherein the portion of the at least one spiral pattern includes a plurality of synchronization marks.

6. The method of claim 1, wherein determining the approximate spiral slope comprises estimating an average circumferential width of the portion of the at least one spiral pattern.

7. The method of claim 6, wherein estimating the average circumferential width of the portion of the at least one spiral pattern further comprises determining an average duration of the curve-fitted function for the amplitude value distribution.

8. The method of claim 1, wherein the curve-fitted function is a Gaussian function.

9. A disk drive that approximates spiral slope in spiral patterns, the disk drive comprising:
    a disk having at least one spiral pattern that extends radially across the disk;
    a head to read a portion of the at least one spiral pattern; and
    a processor to approximate a spiral slope of the portion of the at least one spiral pattern by implementing operations including:
        reading amplitude values for the portion of the at least one spiral pattern;
        determining an amplitude value distribution based on the amplitude values;
        determining a curve-fitted function for the amplitude value distribution; and determining an approximate spiral slope based on the curve-fitted function.

10. The disk drive of claim 9, wherein the processor further implements operations including:
   determining approximate spiral slopes for at least two portions of the at least one spiral pattern at different radial track locations; and
   calculating a difference value between the spiral slopes of the at least two portions.

11. The disk drive of claim 10, wherein the processor further implements operations including:
   determining that the difference value exceeds a spiral slope variance threshold; and designating the disk as defective.

12. The disk drive of claim 10, wherein the processor further implements operations including:
   determining that the difference value exceeds a spiral slope variance threshold; and compensating for spiral slope variance during servo writing.

13. The disk drive of claim 9, wherein the portion of the at least one spiral pattern includes a plurality of synchronization marks.

14. The disk drive of claim 9, wherein determining the approximate spiral slope comprises estimating an average circumferential width of the portion of the at least one spiral pattern.

15. The disk drive of claim 14, wherein estimating the average circumferential width of the portion of the at least one spiral pattern further comprises the processor implementing operations including determining an average duration of the curve-fitted function for the amplitude value distribution.

16. The disk drive of claim 9, wherein the curve-fitted function is a Gaussian function.

17. A disk drive that approximates spiral slope in spiral patterns, the disk drive comprising:
   a disk having at least one spiral pattern that extends radially across the disk;
   means for reading a portion of the at least one spiral pattern;
   means for reading amplitude values for the portion of the at least one spiral pattern;
   means for determining an amplitude value distribution based on the amplitude values;
   means for determining a curve-fitted function for the amplitude value distribution; and
   means for determining an approximate spiral slope based on the curve-fitted function.

18. The disk drive of claim 17, further comprising:
   means for determining approximate spiral slopes for at least two portions of the at least one spiral pattern at different radial track locations; and
   means for calculating a difference value between the spiral slopes of the at least two portions.

19. The disk drive of claim 18, further comprising:
   means for determining that the difference value exceeds a spiral slope variance threshold; and
   means for designating the disk as defective.

20. The disk drive of claim 18, further comprising:
   means for determining that the difference value exceeds a spiral slope variance threshold; and
   means for compensating for spiral slope variance during servo writing.

\* \* \* \* \*